Oct. 2, 1962 M. MORGAN Re. 25,250
ZIPPER ACTUATOR
Original Filed Feb. 10, 1958
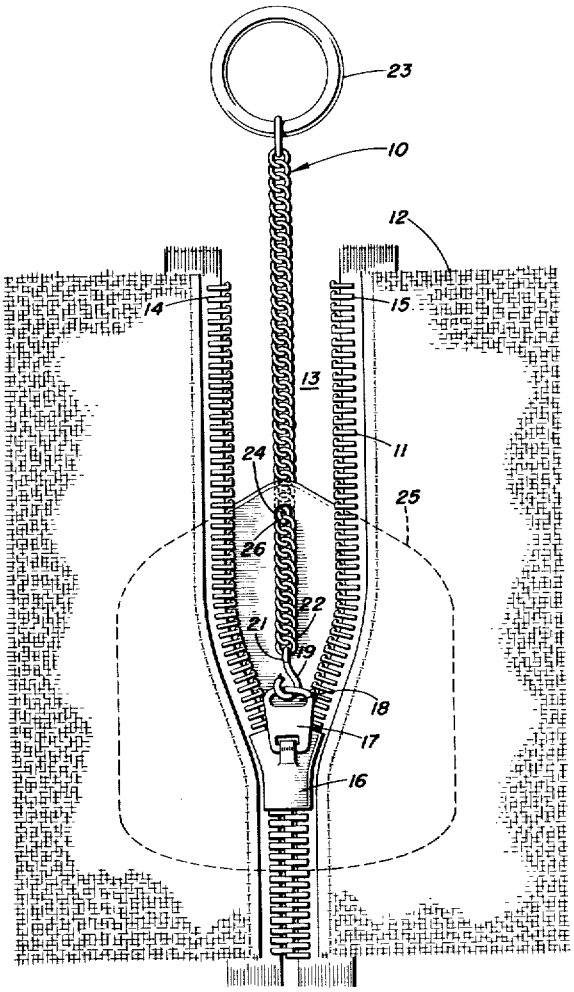
MYLES MORGAN
INVENTOR.
BY Norman S. Blodgett
ATTORNEY United States Patent Office Re. 25,250
Reissued Oct. 2, 1962

25,250

ZIPPER ACTUATOR

Myles Morgan, 3 Academy St., Worcester, Mass.

Original No. 2,939,193, dated June 7, 1960, Ser. No. 714,087, Feb. 10, 1958. Application for reissue Nov. 10, 1961, Ser. No. 154,097
4 Claims. (Cl. 24—205.15)

Matter enclosed in heavy brackets [ ] appears in the original patent but forms no part of this reissue specification; matter printed in italics indicates the additions made by reissue.

This invention relates to a zipper actuator and more particularly to a device for use with a slide fastener of the type commonly used in the fastening of clothing.

Slide fasteners, commonly called "zippers," are often used as fasteners for use with clothing. In some circumstances, the slide fastener is used in parts of the clothing where it is not only difficult to actuate the slide but considerable difficulty is experience with the fact that the fastener engages and grasps the clothing and flesh underlying the fastener. This is particularly true when the slide fastener is used on the back of a woman's dress; not only is it difficult to reach this part of the human body but the movement of the body necessary to accomplish the drawing of the fastener also results in a wrinkling and bulging of the cloth underlying the dress. This is particularly true when, as very often occurs at the present time, the dress is quite tight and the slide fastener is relied upon to draw the dress tightly about the body. These and other difficulties experienced with the prior art devices have been obviated in a novel manner by the present invention.

It is, therefore, an object of the present invention to provide a zipper actuator capable of fastening and unfastening a slide fastener which is situated in a relatively inaccessible part of the body.

A still further object of the present invention is the provision of an actuator for use with a slide fastener which is capable of drawing the slide without experiencing the difficulty of the fastener engaging and grasping clothing or flesh underlying the fastener.

It is another object of the present invention to provide a zipper actuator of very simple construction which can be readily operated and which is relatively inexpensive to manufacture.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which the single FIGURE is an elevational view of an article of clothing having a slide fastener used in conjunction with an actuator embodying the principles of the present invention.

Referring to the drawing, it can be seen that the zipper actuator, designated generally by the reference numeral 10, is being used in conjunction with a zipper or slide fastener 11 which is incorporated in an article of clothing 12. The article of clothing, which is shown only in a fragmentary manner, is illustrative of a portion of the back of a woman's dress having a vertical opening 13 adapted to be closed by the slide fastener 11. The slide fastener consists of a left-hand track 14 and a right-hand track 15 suitably sewn to the edges of the opening 13 of the garment. Each track consists of a series of small fingers adapted to be inter-engaged by means of a slide 16 which has a finger 17 [pivotly] *pivotally* attached to its upper portion. The finger 17 is provided at its outer portion with an aperture 18.

The actuator 10 is provided with a hook 19 having a loop 21 engaging the bottom link of a flexible member such as a chain 22. At its other end the chain 22 is attached to a finger *grip such as the finger* ring 23. At an intermediate point the chain 22 passes through an aperture 24 formed in the upper end of a shield 25. Preferably, the shield 25 is of a broad oval conformation with a generally pointed portion at one end through which the aperture 24 passes. The shield 25 is preferably formed of plastic, is fairly thin, and is provided with beveled or rounded edges. The chain 22 is provided with a link 26 which is considerably smaller than the other links in the chain. The aperture 24 is of such a size that the link 26 may reside in it, but the links on either side may not pass through the aperture so that the shield 25 is effectively retained in one place. The shield is selected of such a size and fastened at such a point in the chain 22 that when the chain, hook, and shield are suspended from the finger ring 23 the shield lies beside the hook 19 with the hook approximately in the center of the shield, as is shown in the drawing.

The operation of the invention will now be readily understood in view of the above description. Let us assume that the zipper 11 is used to close an opening 13 in the back of a dress 12. The [slidable] *slide* fastener 11 would normally be closed by moving the slide 16 upwardly to draw the tracks 14 and 15 together to closed position, as shown in the lower part of the drawing. This is done by grasping the tab 17 between the fingers and drawing in the direction of the track. However, when the [slidable] *slide* fastener is incorporated in the back of a dress it is very difficult for [a] *the* person *wearing it* to twist [his] *her* arm around and grasp the tab 17. Therefore, the person wearing the dress passes the hook 19 of the invention through the aperture 18 and the tab 17. This may be done before the clothing is put on or, if the lower part of the zipper is far enough down in the back, *it may be done* while the clothing is on one's person. Then the chain 22 is passed upwardly [and] over the shoulder and the finger ring 23 is grasped to pull upwardly on the chain. At the time the hook is engaged, however, the shield 25 is placed between the dress 12 and the body or cloth underlying it, as is shown on the drawing. The upward pulling on the chain 22 causes the slide 16 to move upwardly and join the tracks 14 and 15 in the usual manner. The shield 25 assures that no cloth or flesh comes in contact with the fastener 11 so that there is no interference with the fastening of the zipper.

While certain novel features of the invention have been shown and described and are pointed out in the annexed claims, it will be understood that various omissions, substitutions, and changes in the forms and details of the device illustrated and in its operation may be made by those skilled in the art without departing from the spirit of the invention.

The invention having been thus described what is claimed as new and desired to secure by Letters Patent is:

1. A zipper actuator for use with a slide fastener located in an inaccessible portion of a garment, comprising a finger ring adapted to be grasped by the person wearing the garment, a hook adapted to be passed through the aperture of the slide of the fastener, an elongated chain joining the ring and the hook, a broad, flat, plate-like, rigid shield loosely fastened at one extremity of the shield to the chain so as to hang beside the hook when the chain and hook are suspended from the ring, the shield serving to prevent the engagement by the fastener of a body underlying it when the shield is placed between the slide and the body, the shield having an aperture at said one extremity through which the chain passes and by which it is fastened thereto, the chain having a small link residing in the aperture in the shield, the links of the chain on either side of the small link being too large to pass through the said aperture in the shield.

2. A zipper actuator for use with a slide fastener located in an inaccessible portion of a garment, comprising a finger grip adapted to be grasped by the person wearing the garment, a hook adapted to be passed through the aperture of the slide of the fastener, an elongated chain joining the grip and the hook, a broad, flat, plate-like, rigid shield loosely fastened at one extremity of the shield to the chain so as to hang beside the hook when the chain and hook are suspended from the grip, the point at which the shield is fastened to the chain being a substantial distance from the hook so that the hook is normally located generally centrally of the shield so that a substantial length of chain exists between the hook and the said point, the shield serving to prevent engagement by the fastener of a body underlying it when the shield is placed between the slide and the body, the shield having an aperture at the said one extremity to which the chain is attached and by which it is fastened thereto, and means forming part of the chain insuring against movement of the shield longitudinally of the chain.

*3. A zipper actuator for use with a slide fastener located in an inaccessible portion of a garment, comprising a finger ring adapted to be grasped by the person wearing the garment, a hook adapted to be passed through the aperture of the slide of the fastener, an elongated flexible member joining the ring and the hook, a broad, flat, plate-like shield loosely fastened at one extremity of the shield to the flexible member so as to hang beside the hook when the flexible member and hook are suspended from the ring, the shield serving to prevent the engagement by the fastener of a body underlying it when the shield is placed between the slide and the body, the shield having an aperture at said one extremity through which the flexible member passes and by which it is fastened thereto,*

*the flexible member having a reduced portion residing in the aperture in the shield, the portions of the flexible member on either side of the reduced portion being too large to pass through the said aperture in the shield.*

*4. A zipper actuator for use with a slide fastener located in an inaccessible portion of a garment, comprising a finger grip adapted to be grasped by the person wearing the garment, a hook adapted to be passed through the aperture of the slide of the fastener, an elongated flexible member joining the grip and the hook, a broad, flat, plate-like shield loosely fastened at one extremity of the shield to the flexible member so as to hang beside the hook when the flexible member and hook are suspended from the grip, the point at which the shield is fastened to the flexible member being a substantial distance from the hook so that the hook is normally located generally centrally of the shield so that a substantial length of the flexible member exists between the hook and the said point, the shield serving to prevent engagement by the fastener of a body underlying it when the shield is placed between the slide and the body, the shield having an aperture at the said one extremity to which the flexible member is attached and by which it is fastened thereto, and means forming part of the flexible member insuring against movement of the shield longitudinally of the flexible member.*

References Cited in the file of this patent or the original patent

UNITED STATES PATENTS

| | | |
|---|---|---|
| 2,531,805 | Clark | Nov. 28, 1950 |
| 2,811,763 | Jordan | Nov. 5, 1957 |
| 2,820,273 | McColly | Jan. 21, 1958 |
| 2,887,752 | Maio | May 26, 1959 |
| 2,888,728 | Lebermann | June 2, 1959 |